United States Patent [19]

Bouffard

[11] Patent Number: 4,555,863
[45] Date of Patent: Dec. 3, 1985

[54] SNARE TRAP

[76] Inventor: Ivan Bouffard, Chemin du lac de l'ESt, Coleraine, Quebec, Canada, G0N 1B0

[21] Appl. No.: 567,631

[22] Filed: Jan. 3, 1984

[51] Int. Cl.[4] .............................................. A01M 23/34
[52] U.S. Cl. ........................................................ 43/87
[58] Field of Search ............................................. 43/87

[56] References Cited

U.S. PATENT DOCUMENTS

| | | | |
|---|---|---|---|
| 1,860,378 | 5/1932 | Bailey | 43/87 |
| 2,178,256 | 10/1939 | Graybill | 43/87 |
| 2,200,617 | 5/1940 | Clover | 43/87 |
| 4,389,807 | 6/1983 | Novak | 43/87 |

FOREIGN PATENT DOCUMENTS

| | | | |
|---|---|---|---|
| 332087 | 2/1933 | Canada. | |
| 1113722 | 8/1981 | Canada | 43/80 |

Primary Examiner—Nicholas P. Godici
Assistant Examiner—Chris McKee

[57] ABSTRACT

A snare trap which comprises an outer frame, a spring-actuated inner frame secured to the outer frame and adapted to pivot about an axis normal to its longitudinal extent from a first position where the inner frame lies within the outer frame to a second position after a rotation of 180°. A latch holds the inner frame in its first position, a trigger plate releases the latch when depressed by an animal paw. A snare is removably secured to the outer frame and defines a noose around the trigger plate, which noose is adapted to be drawn by the inner frame around the leg of an entrapped animal when the trap is sprung.

3 Claims, 5 Drawing Figures

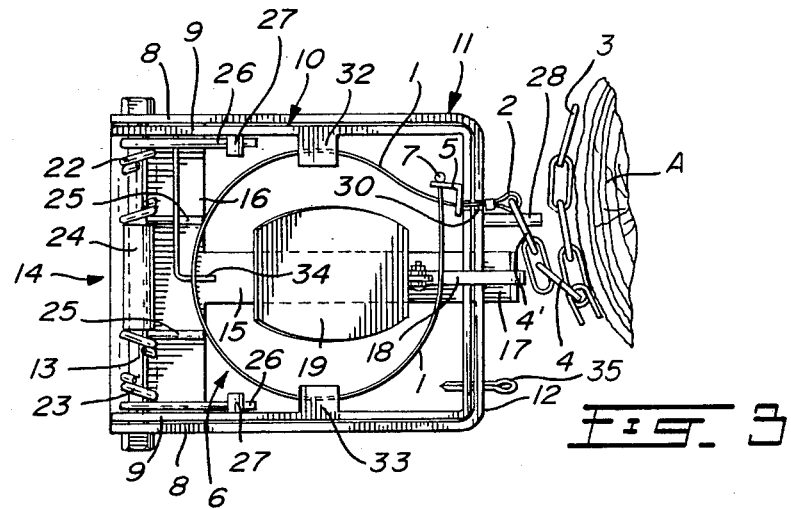
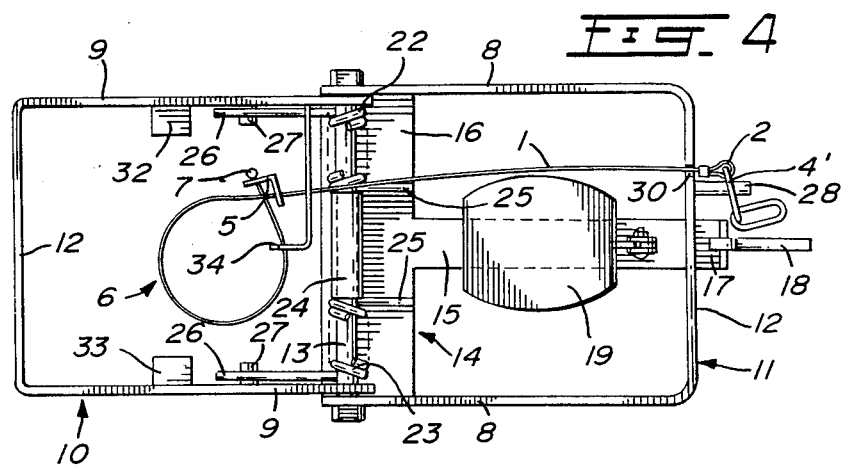
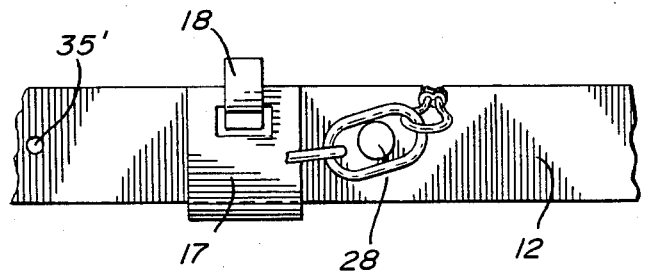

SNARE TRAP

FIELD OF THE INVENTION

The invention relates to animal traps comprising a section swinging upwardly through an arc under the urging of a coil spring to tighten a noose around the leg of an animal.

PRIOR ART

In snare traps as heretofore used, the animal is often harmed when fighting to get free because it is impossible to separate the snare from the spring actuated frame once the animal is caught.

OBJECTS OF THE INVENTION

It is therefore a first object of the invention to provide a trap in which the snare will easily be separated from the frame once the animal is trapped.

It is a second object of the invention to provide a trap that is relatively inexpensive to manufacture.

Further objects and features of the invention will become apparent from the detailed description to follow, of a particular embodiment of the invention, when read in connection with the drawings to which it refers.

SUMMARY OF THE INVENTION

A snare trap which comprises an outer frame, a spring-actuated inner frame secured to the outer frame and adapted to pivot about an axis normal to its longitudinal extent from a first position where the inner frame lies within the outer frame to a second position after a rotation of 180°. A latch holds the inner frame in its first position, a trigger plate releases the latch when depressed by an animal paw. A snare is removably secured to the outer frame and defines a noose around the trigger plate, which noose is adapted to be drawn by the inner frame around the leg of an entrapped animal when the trap is sprung.

BRIEF DESCRIPTION OF THE DRAWINGS

FIG. 3 is a plan view of the trap shown in set position;

FIG. 4 is a plan view of the trap shown in sprung position; and

FIG. 5 is a side elevation showing the short rod removably holding the snare.

DESCRIPTION

Figures 1, 2:
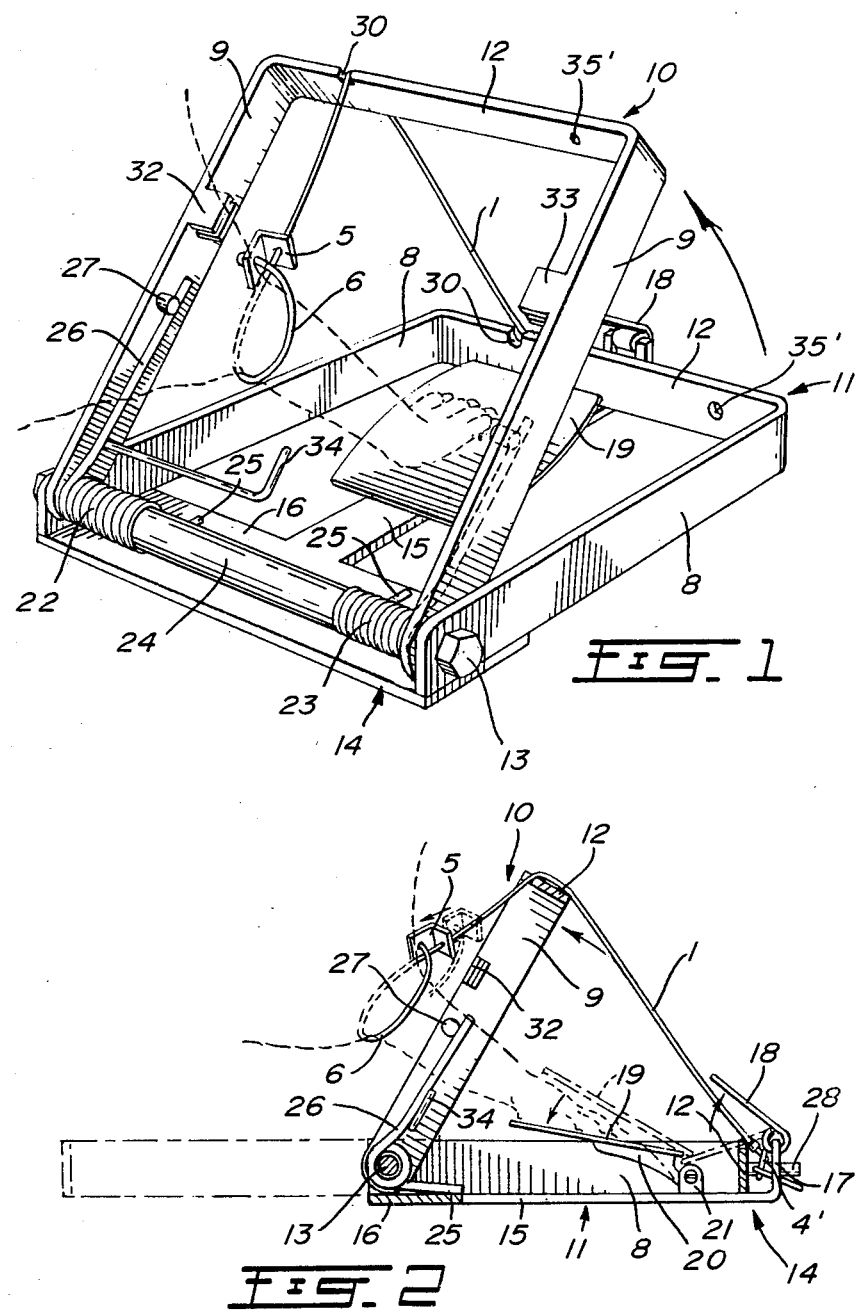
FIG. 1 is a perspective view of an animal trap in accordance with the invention.
FIG. 2 is a side elevation of the trap shown in an intermediate position.

In a preferred embodiment of the animal trap, a flexible wire 1 has a first end which is tied up to form a loop 2 which is secured to an anchoring collar 3 tied around a post or a tree.

The anchoring collar 3 is made of a chain removably secured to the loop 2 by means of an openable link 4. A locking plate 5 is bent at an angle of substantially 90° and pierced at each extremity to slidably receive wire 1. Locking plate 5 closes the noose 6 and a cap 7 is installed at the extremity of the flexible wire 1 to prevent it from sliding out of the locking plate 5.

The locking plate 5 is built to allow a fast reduction of the noose 6 diameter in order to grab the leg of the entrapped animal and keep a firm grip on it.

The collar 3 serves to anchor the noose 6, for instance, by surrounding a tree "A".

The noose 6 is removably secured to a metal frame comprising two U-shaped frames 10 and 11 encasing in each other.

Each of the frames 10 and 11 is formed of a metal plate bent to form two parallel members 8 and 9 of equal length separated by a transverse member 12.

The two frames 10 and 11 are pivotally secured together by means of a pivot bolt 13 located at the free end of the parallel members 8 and 9. A reinforcing plate 14 having a first elongated member 15 and a second member 16 transversely oriented relative to the first member 15 is secured under the outside frame 11 with its transverse member 16 located across the free ends of the parallel members 8.

The elongated member 15 is secured under the transverse member 12 and exceeds the frame perimeter; the end section 17 of first member 15 is bent at an angle of substantially 90° to secure a latch 18 at the upper edge level of transverse member 12 of outer frame 11, so as to overlie member 12 of interior frame 10 when closed. A trigger plate 19 and a supporting member 20 are pivotally fastened on the elongated member 15 through a bracket 21. The plate 19 is adapted to hold the latch 18 in a substantially horizontal position overlying and retaining the inner frame as long as the trigger plate 19 is not depressed. Two coil springs 22 and 23 having arms extending from the upper and lower extremities are coiled around the bolt 13.

A first arm 25 of each spring 22 and 23 is in contact with the second member 16 of the reinforcing plate 14 while the second arm 26 is secured to the inside wall of the parallel member 9 of the inside frame by means of a protruding stud 27. The torsion springs 22 and 23 are forcing the interior frame out of the outside frame to a position where the two frame sections are horizontal and opposite. The interior frame is retained in the outside frame by means of the latch 18.

A tube 24 of a diameter slightly larger than the bolt diameter receives bolt 13 between the springs 22 and 23 to position the latter against members 9 of inner frame 10. The link 4' of the anchoring collar 3 is removably retained on a short rod 28 secured to the outside frame 11. Rod 28 allows the link 4' to be easily disengaged from the frame sections once the trap is sprung. The rod 28 is transversely secured on the outside wall of the transverse member 12 of outer frame 11.

The flexible wire 1 is also positioned within grooves 30 which prevent the flexible wire from slipping laterally when the inside frame 10 is swinging.

Grooves 30 are made in the top edge of transverse member 12 of each frame 10 and 11 and are in registry adjacent short rod 28.

Supports 32, 33 and 34 are provided to position the noose 6 around the trigger plate 19; supports 32 and 33 comprising two parallel plates having a gap slightly wider than the diameter of the flexible wire 1 are secured to the inside wall surface of the interior frame parallel members 9.

Support 34 is secured nearby the free end of one of the parallel members 8, it extends parallelly to the bolt 13 and is ended by a transversely oriented section to support the noose 6.

A hole 35' is pierced through both frames to insert a security pin 35, a preferred location for the security pin 35 is on the transverse member 13 of each frame 10 and 11. Also, a padding can be secured around the transverse member 12 of the inside frame 10 to protect the animal against injury from the frame 10 when the latter rotates to its sprung position.

What I claim is:

1. A snare trap comprising a noose and means for tightening said noose, such means consisting of an outer frame, a spring-actuated inner frame pivotally secured to said outer frame and adapted to pivot about an axis normal to its longitudinal extent from a first set position where said inner frame lies within said outer frame to a second sprung position after a rotation of substantially 180°, latch means for releasably retaining the swinging end of said inner frame in its first position, trigger means by which an animal can release said latch means, said noose, when set, removably secured to said outer frame and surrounding said trigger means when said inner frame is in set position and adapted to be drawn upon the leg of an entrapped animal when the trap is sprung, said outer frame comprising a base section supporting said latch means and said trigger means, a wall section secured to said base section, extending in a transverse plane relative to the plane of said base section to surround said inner frame when in its first position, and a short rod secured to said outer frame at a distance from said axis and detachably engaging a first part of said noose and releasing said first part when the trap is sprung.

2. The snare trap of claim 1, wherein a number of supports are provided along said inner frame to releasably position said noose around said trigger means.

3. The snare trap of claim 1, wherein each frame is of U-shape including a pair of parallel members and a transverse member, the outer ends of the parallel members of the two frames being interconnected by a pivot bolt, a coil spring surrounding said pivot bolt and engaging said base section and a parallel member of said inner frame, and urging said inner frame to said second position, said short rod secured to the transverse member of said outer frame externally thereof, the transverse members of both frames each having a groove in registry with said short rod and releasably receiving a second part of said noose when said inner frame and said noose are in set position.

* * * * *